United States Patent [19]

McCarty et al.

[11] 4,036,176

[45] July 19, 1977

[54] SYSTEM FOR CULTURING AQUATIC ANIMALS

[75] Inventors: James C. McCarty, San Carlos; Dominick Mendola, Sausalito, both of Calif.

[73] Assignee: Syntex (U.S.A.) Inc., Palo Alto, Calif.

[21] Appl. No.: 633,900

[22] Filed: Nov. 20, 1975

Related U.S. Application Data

[63] Continuation of Ser. No. 546,381, Feb. 3, 1975, abandoned.

[51] Int. Cl.² .............................................. A01K 61/02
[52] U.S. Cl. ............................................ 119/3; 119/5
[58] Field of Search ......................................... 119/2–5

[56] References Cited
U.S. PATENT DOCUMENTS

| | | | |
|---|---|---|---|
| 3,842,804 | 10/1974 | Christensen | 119/3 |
| 3,889,639 | 6/1975 | Day et al. | 119/2 |
| 3,916,833 | 11/1975 | Serfling | 119/2 |

*Primary Examiner*—John F. Pitrelli
*Assistant Examiner*—Peter K. Skiff
*Attorney, Agent, or Firm*—Tom M. Moran; William B. Walker

[57] ABSTRACT

This invention is an apparatus and process for culturing aquatic animals. The apparatus comprises a container suitable for retaining water; a plurality of platforms vertically spaced from each other located in said container, the platforms being substantially parallel to each other and being designed to allow water to circulate therethrough while at the same time allowing solid food particles when dropped into the platform area to pass therethrough; and a feeding station placed on each of the platforms in a manner so that each feeding station is vertically and horizontally spaced from each adjacent station, has a structure such that the solid food particles are retained on the feeding station, and is substantially the same area as the adjacent feeding station. This apparatus is particularly useful in a closed-loop aquaculture system in combination with a particle settling tank and a biological filter and is further valuable in the process of raising aquatic animals, particularly crustacean, such as macrobrachium rosenbergi.

13 Claims, 10 Drawing Figures

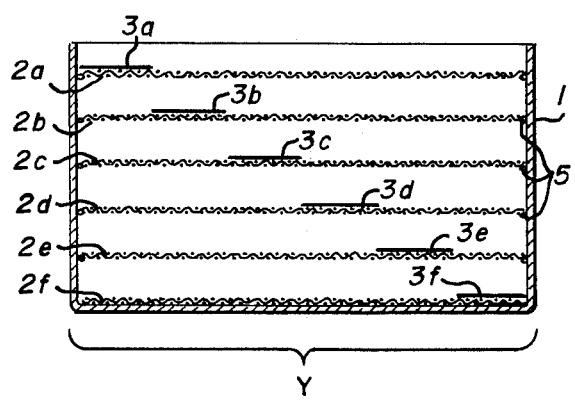
Fig_1
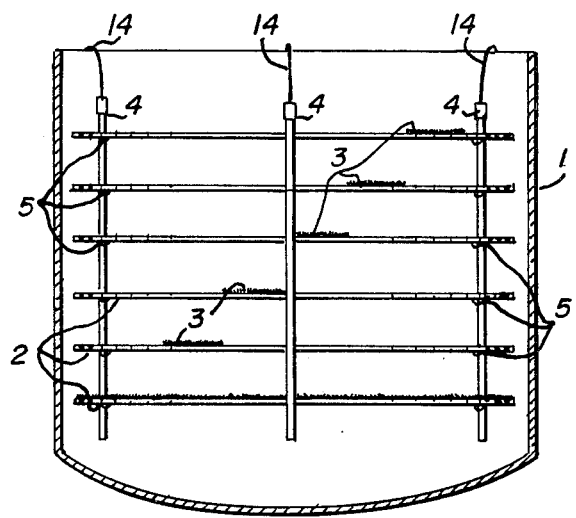
Fig_2
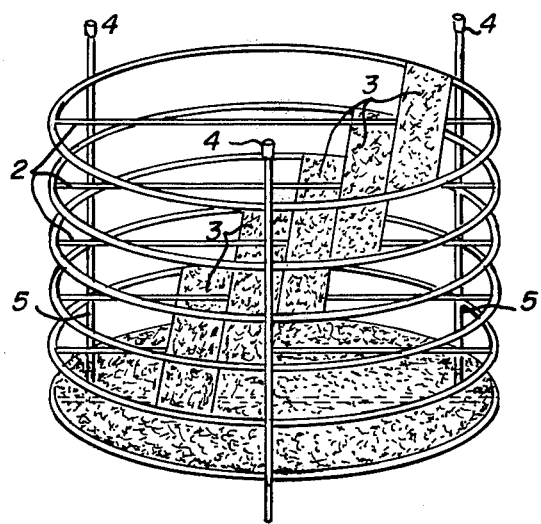
Fig_2a
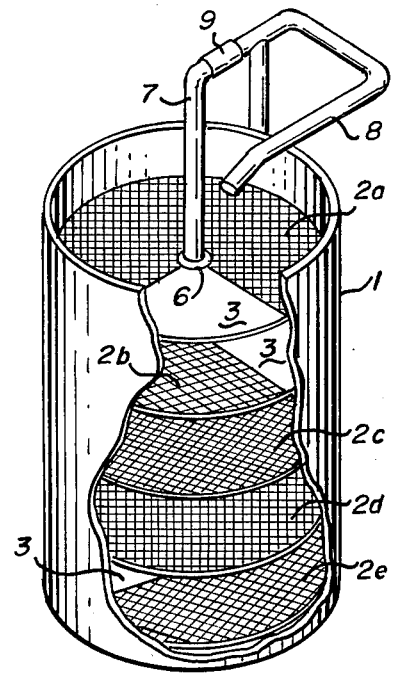
Fig_3

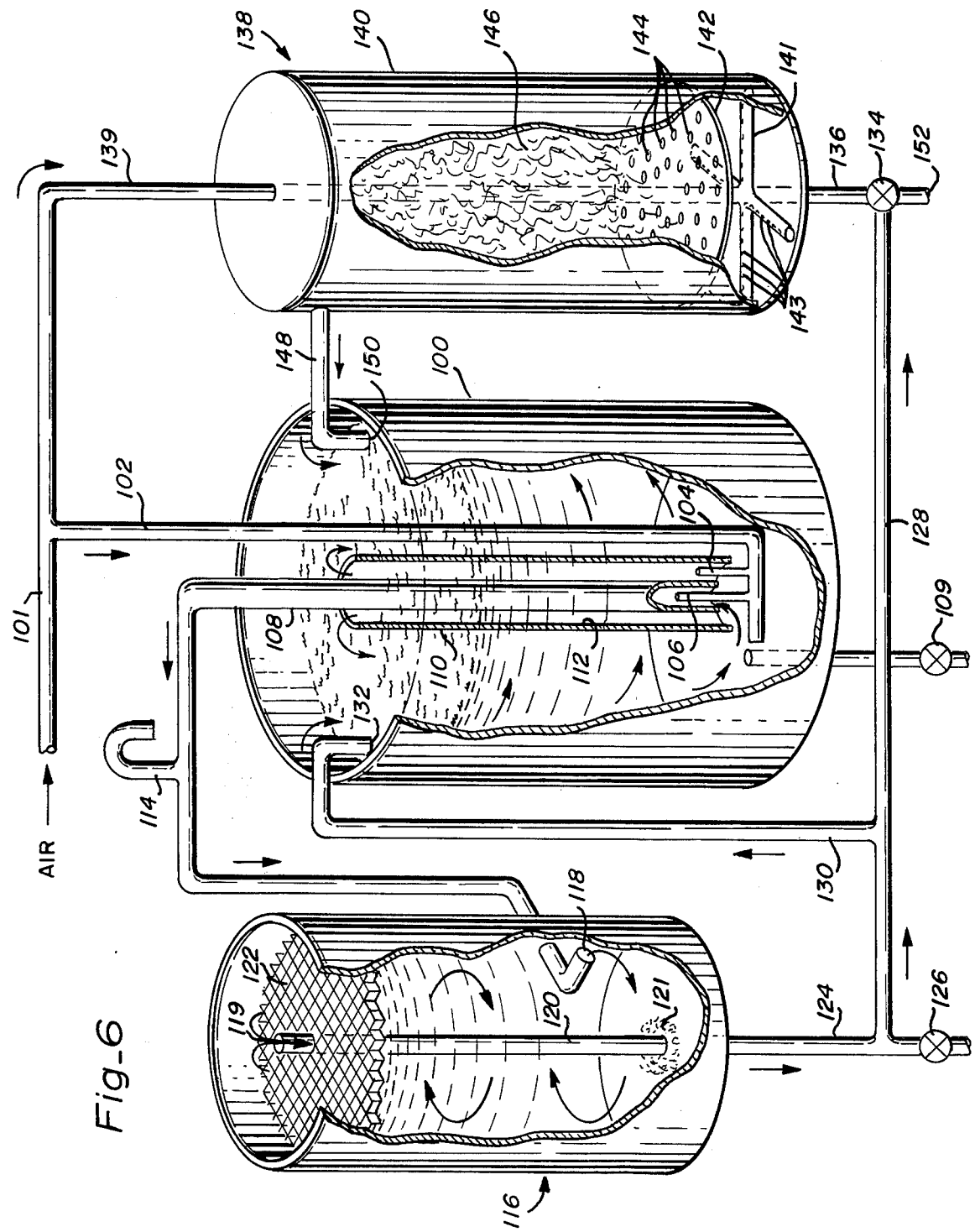
Fig_6

SYSTEM FOR CULTURING AQUATIC ANIMALS

This is a continuation of application Ser. No. 546,381 filed Feb. 3, 1975, now abandoned.

FIELD OF THE INVENTION

This invention relates to an apparatus and process for maintaining aquatic animals in a closed-loop aquaculture system and is premised, at least in part, on a particularly unique design of a container having platforms thereon and feeding stations therein.

DESCRIPTION OF THE PRIOR ART

As the demand for food throughout the world increases, it becomes more and more important to find ways to more efficiently produce food to satisfy this demand. It has been proposed to grow monocultures of aquatic animals under controlled conditions to increase the production of high protein food for human consumption. The medium for supporting aquatic animals is of course water and the life support system may be open (i.e. water is constantly replenished from an outside source) or closed (i.e. the same water is recirculated through the system over and over.)

A closed-loop system offers many advantages such as efficient water use, minimum energy use, maximum utilization of food, control of water quality, and maximum choice of geographical placement.

In growing aquatic animals in a closed-loop system the animals are generally retained in a grow-out container and the water in the container is then purified using various filters. For example, a rather elaborate system is disclosed in U.S. Pat. No. 3,661,262 to Sanders which discloses a closed-loop system for raising pompano fish. Such a system is rather cumbersome and difficult to maintain, however. It is generally known that crustaceans such as lobsters, shrimp, prawns, etc. are known to be cannibalistic to a certain extent and thus is preferred to keep the animals separated from each other in some manner. Various means of doing this has been suggested for use in storing lobsters or shipping them. For example in U.S. Pat. No. 3,727,579 to Lee, an apparatus described as quick disconnect boxes for shipping lobsters in ships and trucks is enclosed. These boxes are connected in a vertical series and have a bottom screen and a watering device in each compartment which waters the lobsters. The water then passes through the screen at the bottom of each compartment. U.S. Pat. No. 1,639,555 to Clark is a shipping tray similar to the Lee tray except that these compartments are not detachable. These devices may be useful in situations where the lobster or crustaceans are being shipped for a short distance but are not useful as a unit in raising the animals from the post larval stage to a marketable adult.

Various other devices have been suggested which include screened-in compartments which may be used in a large body of water such as an ocean or an estuary in order to protect, for example, small fish, from large fish. Such devices are disclosed in U.S. Pat. No. 2,989,945 to Ford and U.S. Pat. No. 1,444,367 to Brolliar. Attempts have been made to produce apparatus which is useful in growing crustaceans such as lobsters in captivity. For example, U.S. Pat. No. 3,815,546 to Plante describes a lobster plant which is a series of tubes having vertically organized separate compartments, each compartment having a single lobster retained therein. The compartments are arranged vertically in a transparent tube, the bottom of each compartment having perforations which allow for the circulation of water therethrough. This has a disadvantage of having to employ a separate elaborate feeding mechanism to get food to each of the compartments individually. Although this process may eliminate cannibalism, it is extremely difficult and expensive to handle each animal separately. U.S. Pat. No. 3,658,034 to Day discloses a series of interconnected tanks each of which has a plurality of habitats for lobsters. One tank has a plurality of vertical screens which constitute habitats, while other tanks have a series of cylindrical pipes arranged with their longitudinal axes aligned with the longitudinal axis of the tank. In both these cases the lobsters must feed at a central area at the bottom of the tank since the food drops to that level. This causes the animals to feed in one place and often leads to fights and cannibalism.

It has been found that the problems of overcrowding and cannibalism which occur in a system such as that described in the Day Patent or the problems with individual feeding resulting from the use of the Plante Patent can be eliminated by apparatus and process of this invention. By utilizing the apparatus of this invention aquatic animals such as crustaceans and others may be easily raised and harvested.

SUMMARY OF THE INVENTION

The apparatus of this invention in its broadest aspect comprises a. a container suitable for retaining water and aquatic animals;

b. a plurality of horizontally oriented platforms vertically spaced from each other in said container, said platforms (i) having an area which is slightly less than the inside cross sectional area of said container (ii) being substantially parallel to each other, (iii) being designed to allow water to circulate therethrough and (iv) having a structure such that solid food particles when dropped into the platform area will pass therethrough; and c. a feeding station placed on each of said platforms in a manner so that each feeding station (i) is vertically and horizontally spaced from each adjacent station, (ii) has a structure such that the solid food particles are retained thereon when dropped into said feeding station area, and (iii) is of substantially the same area as the adjacent feeding station. The above described apparatus is particularly valuable in combination with a biological filter which is utilized to remove harmful amounts of ammonia and nitrites that build up in the water. Also particularly useful in combination with the biological filter and the container having the platforms and feeding stations therein is a particle settling tank designed so that water passes through the settling tank prior to the biological filter to remove any large particles from the system. The feeding of the animals being grown in the container may be automated by including a timed feeding device which drops a measured amount of food for the aquatic animals onto the feeding stations at pre-determined time intervals. The process of raising aquatic animals in a closed-loop aquaculture system which utilizes the particularly described apparatus is also very valuable and will be described hereafter.

DESCRIPTION OF THE DRAWINGS

FIG. 1 is a side view of a rectangular container which houses the apparatus of this invention.

FIG. 2 and 2a side and perspective views of a cylindrical configuration of the apparatus of this invention wherein the feeding stations are substantially rectangular and the platforms are circular.

FIG. 3, 3a and 3b are perspective, top, and side views, respectively of a cylindrical configuration of the apparatus of this invention wherein the platforms are circular and the feeding stations are pie-shaped.

FIG. 6 shows a closed-loop aquaculture system which employs the apparatus of this invention in combination with a particle settling tank and a biological filter.

PREFERRED EMBODIMENTS

Referring to drawings 1-6, the apparatus of this invention can be more fully understood. In drawings 1-5 like numerals refer to like items in the apparatus.

Referring first to FIG. 1 we see an apparatus which is useful for culturing aquatic animals such as lobster, shrimp, crabs, and prawns, particularly macrobrachium species. The apparatus may be used in open or closed-loop aquaculture systems, preferably the latter. The apparatus in its simplest form consists of a container 1 which is suitable for retaining water therein. The shape of the container may be either rectangular or square as diagramatically represented in FIG. 1 or it may be cylindrical as shown in FIGS. 2, 3, and 4, preferably with a concave bottom as in FIG. 2. Containers of other shapes may also be used. The container used may be a pond or small lake, either man-made or naturally occurring. Inside of the container are a series of platforms 2a, 2b, 2c, 2e, 2f which are vertically spaced from each other and substantially parallel to each other. The platforms may be rigid or flexible and are of a structure such that water can freely pass through the openings between the members making up the structure. Thus the platforms may be perforated or reticulated such as a wire mesh. The openings in the structure must be sufficient so that any solid food particles which are added to the containers can also pass through the openings of the platform members. These openings may be in the range from about a millimeter or less up to 10 millimeters or more. The platform members are about the same cross-sectional area as the container in which they fit, but generally will be slightly less, for example from 80 to 90% of the cross-sectional area of the container so animals in the container may move between the edge of the platform member and the wall of the container.

Placed securely on the platform members are feeding station members 3a through 3f. The feeding station members are attached to the platforms in a manner so that each successively descending member is vertically and horizontally spaced from the adjacent member as shown in the staggered arrangement in FIGS. 1 through 5. The feeding station members may be substantially parallel, rectangular-shaped and organized as indicated in FIGS. 1, 2, 2a and 5. These members will thus be about as long as the underlying platform but will be in width at most only about 1/X the length of the underlying platform, X being the number of platforms. Thus, in FIG. 1 since there are 6 platforms and 6 feeding stations, if the distance Y is 12 feet, then each feeding platform will be at most 1/6 × 12 feet or 2 feet wide. Each feeding station should be of equal area so that about the same amount of food is retained thereon.

Alternatively, the feeding platforms may be a series of concentric rings arranged vertically and horizontally in a descending order.

Figure 3A:
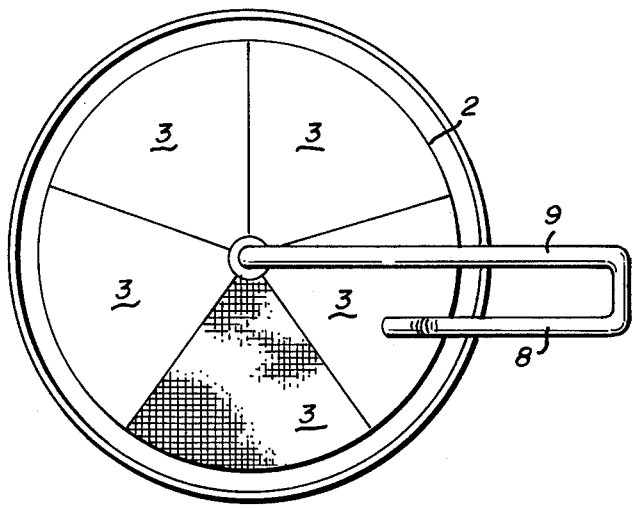
Figure 4:
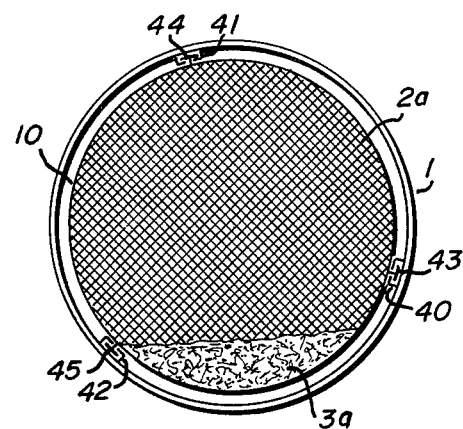
FIGS. 4 and 4a show top and partial perspective views of another cylindrical configuration of this invention.
Figure 3B:
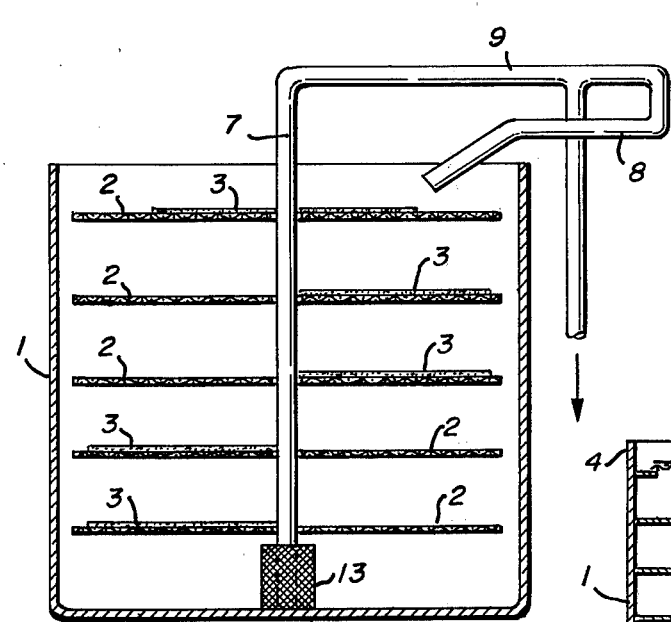

In another configuration, the feeding stations may be pie shaped as shown in FIGS. 3, 3a and 3b. This configuration is particularly useful for very high, narrow containers.

The feeding stations are arranged so that when food is dropped onto the surface of the water in the container the food settles upon each of the feeding stations arranged in the staggered manner. As shown in FIG. 1, the food passes through the platforms 2a-2e and is caught on the feeding stations 3a-3f where the aquatic animals can easily feed. This arrangement allows the animals to feed in a relatively spaced apart area and allows the animals to move around readily on the platform. This design separates the animals from each other and helps to prevent cannibalism which is prevalent among prawns, shrimp and other aquatic animals. By using the platforms as shown in the figures the effective living area of any tank is increased by a factor of at least equal to the number of platforms and more reasonably is increased by a factor of twice the number of platforms since each platform has two sides. Thus, each container can retain a greater number of aquatic animals, thus increasing the yield per container per square foot by a substantial amount.

Food is scattered onto the surface of the water in the container so that approximately equal amounts will fall on each feeding station. This may be done manually or automatically by a device which deposits food on the feeding stations at predetermined intervals.

As pointed out above, each of the platforms are of horizontal areal extent and are vertically spaced from each other. Spacing may be done in several manners as shown in the figures. FIG. 1 shows rigid platforms which are attached at points 5 which in this case are pegs which extend out from the sides of the rectangular tank. In FIG. 2a, which shows only the outline of the platforms and not the reticulate structure, the platforms are attached by being weldedor fastened in some other suitable manner to the legs 4 at points 5. This gives a relatively rigid structure which can easily support the small weight of the growing prawns. The entire structure can be removed if desired by lifting up the legs 4 with the platforms attached and removing the structure from the water. The platforms in FIGS. 1-5 may be spaced apart from the wall of the container so that each of the animals can freely move from one layer to the next and so the platforms, feeding station members, and legs can be removed without binding at the walls. On the other hand there may be large holes or passages in the platforms to allow the passage of the animals from one platform to another. In many cases the mesh size of the platforms will be large enough so that the animals can easily go through the openings in the platforms to get from one layer to another.

Another means of fastening the platforms to the support means is to use, e.g., a flexible rope, particularly nylon rope, as indicated in FIG. 2. Here the rope is attached to each of the platforms. Generally this will be done by merely tying the platforms to the rope so that the platforms are spaced vertically from each other and substantially parallel to each other. The upper part of the rope then is attached to a hook 14 which slips over the sides of the container to support the platforms within the container. When the platforms are to be removed the entire structure can simply be lifted from the container. The animals will tend to remain in the water and will extricate themselves from the platform and remain in the container in the water. In the cylindrical configuration of FIGS. 2 and 2a, generally it will be preferable to have the platforms attached around their periphery to at least 3 vertically extending elongated members which are attached to the sides of the container. While in the rectangular configuration of FIG. 1, 4 elongated members will be used.

FIG. 3 indicates still another means of supporting rigid platforms in a manner which keeps them vertically separated from each other. The platforms are attached, e.g. by welding, to interior conduit 7 at point 6. Again all the platforms can be removed in this particular configuration merely by disconnecting the connecting point 9 from the rest of the pipe and lifting the pipes and the platforms from the container.

Figure 4A:
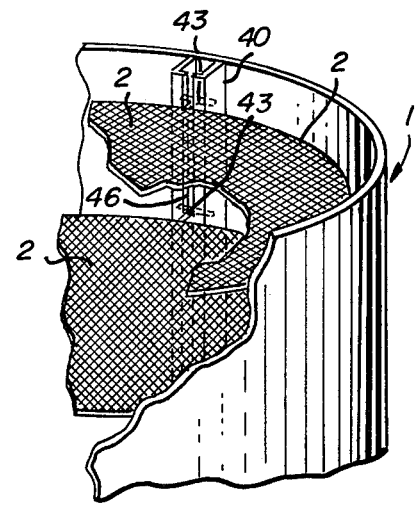

In still another variation of the concept of this invention the platforms may be slidably attached to the sides of the container in which they are located, as shown in FIG. 4, where an embodiment of this invention can be seen from a top view. Here the platform 2a is a flexible reticulate member and has one feeding station member 3a attached thereto. The flexible material may be stretched across and fastened to a rigid or semi-rigid hoop 10. The sides of container 1 have vertically extending elongated members which are retaining grooves 40, 41, 42 which extend along the longitudinal axis of the cylindrical container 1. Although the grooves are shown to be defined by a pair of longitudinal extensions from the wall, the grooves may actually be carved from the wall. At three points equi-spaced around the periphery of the platform 2, there are "T-shaped" extensions 43, 44 and 45 which fit into respective grooves 40, 41, 42 and are retained therein. The flexible platform is stretched taut and held in place by frictional forces. Turning now to FIG. 4a, a cut-away, side perspective view may be seen. Here the two platforms are vertically spaced from each other by placing square bars 46 between extensions 43 and into groove 40.

Figure 5:
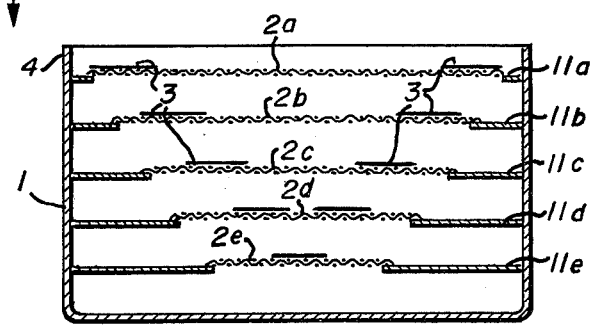
FIG. 5 is a side view of a cylindrical container wherein there are 2 feeding stations on each of four platforms.

Still another means of support of the platforms may be seen in FIG. 5, wherein support means 11a–11e are integrated into the structure of the side of the container 1. Each set of support pegs 11a–11e which support one platform ae progressively longer as the bottom of the container 1 is approached. Thus 11a is shorter than 11b which is shorter than 11c, etc. So the platforms 2a, 2b, 2c, 2 d will fit into the respective positions, each platform will be successively smaller as the bottom of the container is approached, i.e. 2e < 2d < 2c < 2b < 2a.

Turning now to FIG. 6 we see an overall system for raising aquatic animals which is a closed-loop system and coprises an animal raising tank 100 along with a particle settling device 116 and a biological filter 138. The aquatic animal raising tank as shown in FIG. 6 does not have the platforms and feeding stations as described in FIGS. 1–5. The platforms and feeding staions are not included for the sake of simplicity of illustration, but it is to be understood that container 100 may be of any type design discussed previously in FIGS. 1–5. We now turn to a discussion of the apparatus illustrated in FIG. 6 and the interaction of the various parts therein.

Container 100 is the tank in which the aquatic animals such as macrobrachium species are raised. Generally the animals are such that they may fend for themselves and preferably the animals are large enough and strong enough so that they do not get sucked into the water transfer line 108 by the movement of the water from the container 100 to the particle settling means 116. The presence of the platforms and feeding stations is useful in this regard since it allows the animals to hold on to the platforms and tends to prevent substantial channeling of the water. Preferably the containeris cylindrical in shape and has a concave bottom. Generally the container 100 can be made of any non-toxic material but a a particularly useful design container is one which has an interior coating of an epoxy resin which covers a polyurethane foam which in turn is covered on the exterior by a chopped glass mask and which is kept in place by a polyester resin. Any other material such as natural polypropylene, polyethylene, glass, tile, concrete or other non-toxic material may be used as the container. The size of the container may be from a few gallons to many hundreds of gallons but the size chosen depends on the number of animals which are being raised. A particularly useful size range is 500–100 gallons with a diameter of 4–8 feet and a heat of 2–4 feet. Having 5 platforms in an 850 gallon tank 500–1000 prawns may be raised.

Since many of the water transfer means, e.g. the conduits 108, 124, 128, 130 and 148, which connect the container 100 to the particle settling tank 116 and the biological filter 138 are made of polyvinyl chloride and contain plasticizers such as dioctylphthate, it is sometims preferably before placing the animals into the tank 100 and before activating the biological filter 138 to leach these plasticizers from the system. This is generally done by circulating water at an elevated temperature through the system at temperatures of from about 30° to 50° C for a period of time of from about 1 to 10 days in order to remove the plasticizers. The water circulating is then discarded, fresh water is placed in the system, the biological filter is activated and the animals are placed in the container and fed. Generally it is preferable to leach the plasticizers from the pipe using a salt water of a suitable salinity, i.e. about 1 to 100 parts per thousand (ppt) salinity. Salinity may be provided by any known salt useful for that purpose. Because it is particularly inexpensive it has been found that rock salt at a level of 30 parts per thousand is particularly useful in this regard.

The water maybe transferred between the container, the particle settling tank, and the biological filter using any pumps which are known to be useful for that purpose in the art. However, because of the efficiency and inexpensiveness of operation it is particularly preferred to use air lift pumps throughout the system. An air lift technique is shown in FIG. 6 to be used in both transferring water from container 100 to the biological filter and the particle settling tank 116 as well as providing circulation of the water in container 100. Air is delivered from the main line 101 into air line 102 where it is directed into water transfer line 108 and water circulation tube 110 through air injection lines 106 and 104 respectively. The air traveling through water transfer line 108 which is injected at 106 forces the water up through the line and into the particle settling tank 116. Excess air pressure is relieved at air release line 114 and any water that spurts out is returned to the tank 100 by positioning the air release line 114 directly over the tank. Container 100 may be drained by drain line 109 to clean the container. Conduits 102, 108 and 110 may extend through the platforms by designing holes in the platforms sufficient to allow the conduits to be placed therethrough.

The air which is released at air injection line 104 travels up the annulus between water transfer line 108 and water circulation tube 110. This causes an upward flow of water in the annulus and tends to bring additional water in through the bottom of water circulation line 110 shown by arrows F. Along with the water is carried any particulate matter, the particulate matter is then transferred, at least in part, through the water transfer line 108 and into the particle settling tank 116. Although the particle settling tank may be of any design known in the art, here the water enters particle settlng tank 116 through inlet 118 which is positioned to create a circular movement and slight vortexing action in the particle settling tank. As the water and the particles enter the tank at a relatively high velocity and move upward, the water slows down and the particles tend to settle to the bottom and middle of the tank. A grating 122 is located in the upper part of the tank below the mouth 119 of sandpipe 120 and below the surface of the water. The grating is present to further slow down the movement of the water which causes additional particles to drop out of the water and settle to the bottom of the tank as shown at 121. The grating may be any non-toxic type material but preferably is a polyethylene or polypropylene about 1 inch deep defining 1 inch squares. The water then goes over the grating, goes into the mouth 119 of standpipe 120 and then flows into transfer line 124 and is transferred back into the aquatic animal raising tank 100 through line 130 or goes through the biological filter 138. After a substantial amount of particulate matter has settled at the bottom of the particle settling tank 116, standpipe 120 may be removed and the particulate matter 121 drained out thorugh drain valve 126.

The entry point 132 of the water transfer line 130 is positioned so that the water enters the tank 100 and causes the entering water to create a vortexing action which tends to force any particulate matter which may be present in the tank towards the center of the tank where, along with the air lift pumps 104 and 106 the particulate matter tend to be swept towards the water transfer line 108 which then goes back to the settling tank 116.

The water that does not return to the tank 100 is sent to the biological filter. Generally the biological filter may be of any design known in the art, but is preferably as shown in FIG. 6 at 138. Water passes through three-way valve 134 and enters the biologicl filter through line 136. Biological filter 138 generally comprises an outer enclosure 140 which preferably is a cylindrical structure which houses the biological filter medium 146. This medium may be any of the known materials which can be used for biological filters. These include such materials as sand, gravel, stones, open cell foams such as polyurethane foams, and the like. Generally it has been found that several layers of material may be useful. For instance, supported on the support means 142 which has perforations 144 provided therein so that water may circulate therethrough may be a layer of dolomite and gravel which is useful in keeping the pH of the system between about 7 and 9. Placed above that may be a layer of sand or gravel upon which the microorganixms, i.e. nitrosomonas and nitrobacter, can grow.

It has been found that the efficiency of the biological filter is increased substantially if there is included a means for adding air directly to the biological filter. This is indicated in FIG. 6 as air line 139 which terminates in cross arms 141 having perforations 143 thereon. The air comes from the main air source 101, passes through air line 139 and exits via the perforations 143 in the corss arms 141. This assures that the microorganisms are maintained in an aerobic condition to keep them operating at maximum efficiency in converting ammonia and nitrite to non-harmful levels of nitrates. Although FIG. 6 shows the cross arm design of adding oxygen to the biological filter any other design which can attain the same results may be used. For example instead of cross arms a hollow spiral member having perforations on the upper side of the spiral member could be used in place of the cross arms. Or, a series of concentric circles could ne employed or a plate having perforations on the surface of the plate could be also used. The biological filter indicated in FIG. 6 is particularly preferred design since any particulate matter which may go through the particulate settling tank is filtered out by the plate 142 and the biological filtering medium 146 and settles to the bottom of the enclosure 140. After particulate matter builds up at the bottom of the enclosure 140 the enclosure may be back flushed and the particulate matter drained out via three-way valve 134 through drain line 152.

After the water has gone through the biological filter medium 146 it exits the biological filter at water transfer line 146 and reenters the container 100 at 150. The reentry line is designed to work in conjunction with reentry line 132 to cause the vortexing action, that is the circular movement of the water around the tank to assist in forcing the particulate matter in the tank towards the water transfer line 108 in conjunction with the air lift pumps 106 and 104.

In addition to the three items indicated at FIG. 6 a protein skimmer which removes dissolved organics from the circulating water may be included in series between the biological filter and the tank 100, or preferably, the particle settler 116 and the biological filter. Such a protein skimmer may be of any known design such as those found in the book entitled *Fish And Invertebrate Culture, Water Management in Closed Systems* by Stephen H. Spotte, Whiley-Interscience (1970) shown on pp. 52–56. Also useful to be included in the closed-loop aquaculture system is a toxic material filter which may be any type known in the art such as activated charcoal and the like.

A still further preferred aspect of this particular invention is the utilization of a timed feeding device to automate the system and thus make it substantially self-sustaining. In this particular case the timed feeding device is placed above the tank and filled with a suitable food for aquatic animals. The food then drops into the container so that about an equal amount of food falls on each of the feeding platforms. The animals then have a chance to eat and digest this food until the next batch of food falls from the device. In this manner a substantial savings in the cost of labor may be made.

It can be seen that by utilizing the apparatus described above aquatic animals such as prawns and shrimp can be readily raised in a closed-loop system. Generally this process comprises placing the platforms as described above in a water-filled, aquaculture container, placing marine animals in the container, dropping suitable food particles into each of the feeding stations at suitable intervals for the animals to eat and passing water from the container in which the aquatic animals find themselves through a biological filter to convert harmful amounts of ammonia and nitrite to non-harmful amounts of nitrates, and passing the water exiting from the biological filter to the container. Preferably the water passing from the particle settling tank will first pass through a protein skimmer and a toxic chemical filter to further purify it. Further, the temperature of the water will be regulated, preferably to between about 30°-33° C, by having a heating element either inside the container or attached to the line through which the water is circulated. This system although is useful for any aquatic animals such as prawn, shrimp, fish or others and it is found particularly suitable for macrobrachium species of prawns.

Other modifications to the system may be apparent to one skilled in the art and are meant to be included in the closed-loop aquaculture system described in FIG. 6.

I claim as my invention:

1. An apparatus for culturing aquatic animals which comprises
   a. a container suitable for retaining water;
   b. a plurality of horizontally oriented platforms vertically spaced from each other in said container, said platforms (i) having an area which is slightly less than the inside cross-sectional area of said container, (ii) being substantially parallel to each other, and (iii) being designed to allow water and solid aquatic animal food particles to pass therethrough, and
   c. a feeding station having an area smaller than the platform on which it is placed and being placed on each of said platforms in a manner so that each feeding station (i) is vertically and horizontally spaced from each adjacent station, (ii) has a structure such that said solid food particles are retained thereon when dropped onto said feeding station, and (iii) is of substantially the same area as the adjacent feeding station.

2. The apparatus of claim 1 wherein all platforms are supported by each being attached to a least 3 vertically extending elongated members, said elongated members being attached to the sides of the container.

3. The apparatus of claim 2 wherein said elongated members are flexible nylon ropes.

4. The apparatus of claim 1 wherein said container is connected to a biological filter so that water may circulate through said biological filter and back to said container.

5. The apparatus of claim 4 wherein said container is connected in series to a particle settling tank so that water passes through said particle settling tank prior to said biological filter.

6. The apparatus of claim 4 wherein said biological filter comprises
   an elongated enclosure being closed at the base to retain inflowing water;
   a water inlet at the base of said enclosure;
   a water-permeable support means above said inlet;
   at least one porous medium sufficient to grow nitrosomas and nitrobacter organisms supported on said support means; and
   a liquid outlet from said enclosure located above said porous medium.

7. The apparatus of claim 1 wherein said container has a concave bottom.

8. The apparatus of claim 7 wherein said container has a drain valve at the low point of said concave bottom.

9. The apparatus of claim 4 wherein a first air lift pump is positioned in said container so that water may be transferred from said container to said biological filter.

10. The apparatus of claim 9 wherein a second air lift pump is positioned to cause water and mobile particulate matter to circulate towards said first air lift pump.

11. A process for raising aquatic animals in a closed-loop aquaculture system which comprises
    placing in a container a plurality of horizontally oriented platforms substantially parallel to and vertically spaced from each other, said platform (i) having an area which is slightly less than the inside cross-sectional area of said container, (ii) being designed to allow water and solid food particles for aquatic animals to pass therethrough and (iii) having a feeding station on each platform, each feeding station (a) being vertically and horizontally spaced from each adjacent feeding station, (b) being designed to retain solid food particles thereon, and (c) being of substantially the same area as each adjacent feeding station;
    placing suitable aqueous medium in said container;
    placing aquatic animals in said medium;
    dropping suitable food particles onto the surface of said aqueous medium so that approximately equal amounts of such food particles fall on each of said feeding stations at suitable intervals;
    passing said aqueous medium from said container through a biological filter to convert ammonia and nitrites in said aqueous medium to non-harmful amounts of nitrates; and
    passing said aqueous medium exiting from biological filter back to said container.

12. The process of claim 11 wherein said aquatic animals are adult macrobrachium species.

13. The process of claim 11 which includes the step of passing said aqueous medium from said container to a particle settling tank to remove particulate matter suspended in said aqueous medium prior to passing said medium through said biological filter.

* * * * *